UNITED STATES PATENT OFFICE.

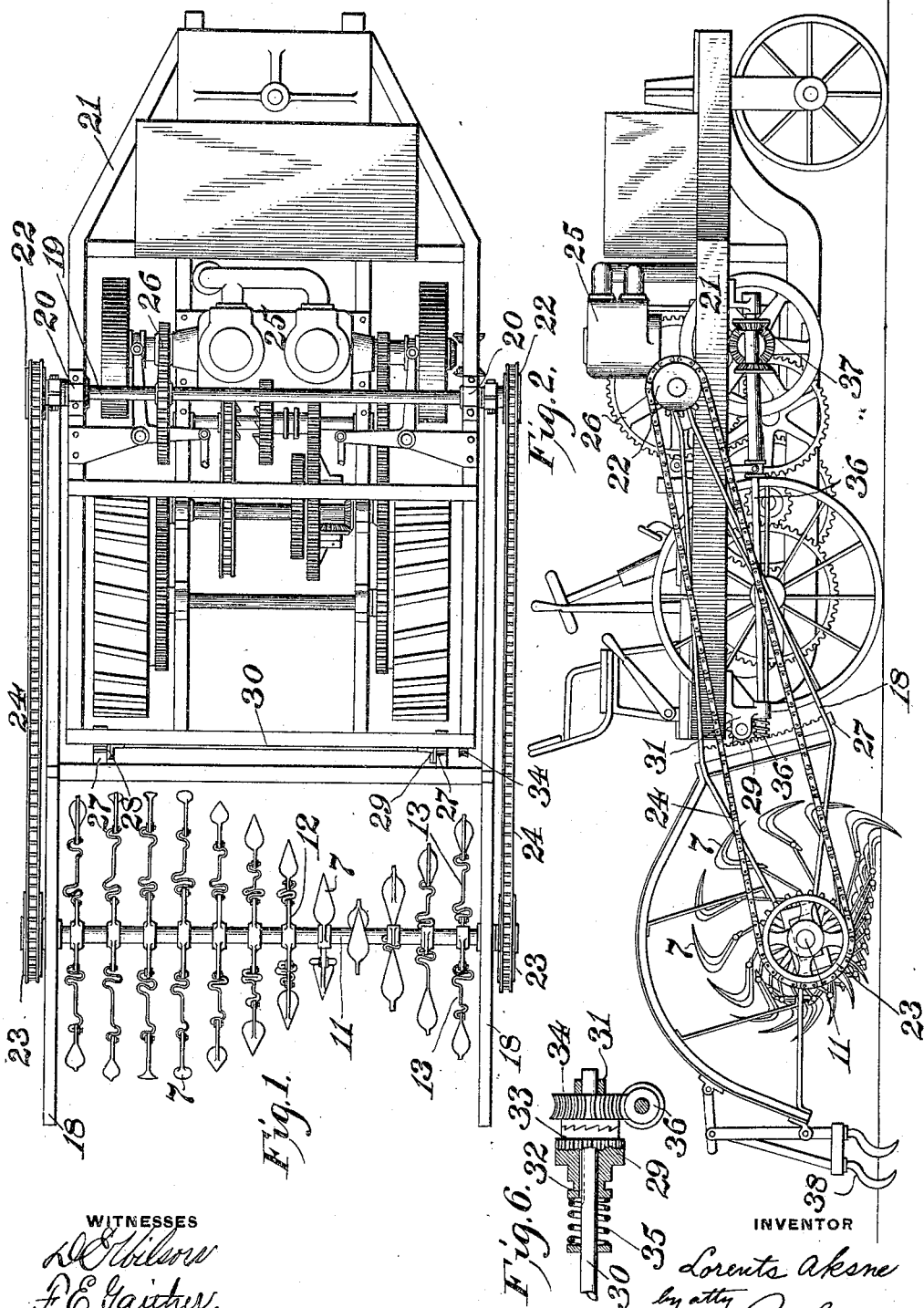

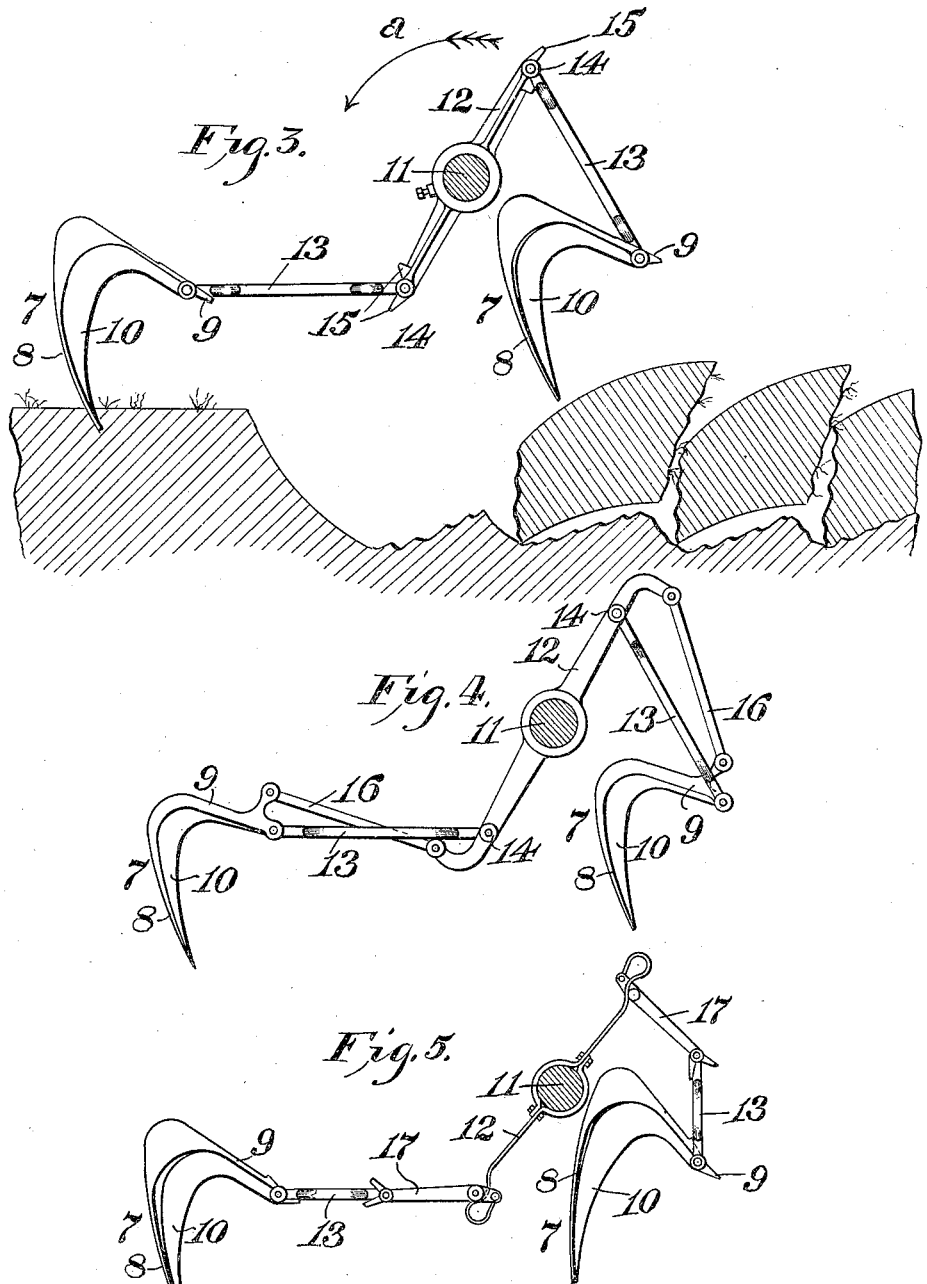

LORENTS AKSNES, OF WILKINSBURG, PENNSYLVANIA.

ROTARY CULTIVATOR.

No. 915,404.  Specification of Letters Patent.  Patented March 16, 1909.

Application filed July 7, 1905. Serial No. 268,713.

*To all whom it may concern:*

Be it known that I, LORENTS AKSNES, a subject of the King of Norway, residing at Wilkinsburg, in the county of Allegheny and State of Pennsylvania, have invented certain new and useful Improvements in Rotary Cultivators, of which the following is a specification.

My invention relates to that class of machines in which the earth is cut and turned over by means of a series of revolving spades or blades, mounted upon a main driving shaft adapted to be operated from any suitable form of carriage to which it may be attached, and its objects are to provide an apparatus wherein the parts are so constructed and arranged that the blades will be acted upon by centrifugal force in a manner to cause them to enter the ground in the most advantageous position and at the moment when they have attained their maximum velocity, and one in which the blade after it has entered the ground, will, together with a piece of earth, be forced in a direction opposite to that in which the machine is moving, at a comparatively low speed, thereby greatly reducing the strain upon the blades and operating mechanism. It is also an object of my invention to provide a connection between the blades and main driving shaft of sufficient flexibility to take up any jar consequent upon the impact of the blades against the ground or any heavy obstacles which may be met, and to so mount the blades that they will be free to pass over and not be forced through the earth after it has been turned. A further object is a construction of apparatus in which the revolving blades or cutters and operating mechanism may be mounted in an independent supporting frame capable of being raised and lowered when desired, and readily connected to any preferred form of carriage.

These objects, and other advantages which may hereinafter appear, I attain by means of the construction illustrated in preferred form in the accompanying drawings, wherein—

Figure 1 is a plan view of my improved rotary cultivator as applied to a traction engine or motor, the blades being shown, for the purpose of illustration, in the extreme position to which centrifugal force brings them;

Figure 2 is a side elevation of the same, showing the supporting frame lowered and the blades in the relative positions they will assume when the machine is in operation;

Figure 3 a similar view, on an enlarged scale, of a pair of blades attached to the operating shaft and illustrating the manner in which they enter the ground and pass over the same after it has been turned;

Figure 4 a similar view, showing a modified form of the mechanism employed to connect the blades to the operating shaft.

Figure 5 a similar view showing a still further modification of the same, and

Figure 6 a detail view of one end of the shaft employed to raise and lower the frame supporting the blades and operating shaft, together with the clutch employed to permit the frame to be raised when the machine is in operation, independently of the actuating worm and also for throwing said shaft and worm into and out of engagement, as desired.

In my preferred construction of cultivators a link of suitable length is interposed between the blade and the lever which acts as a carrier and is secured to the operating shaft, which link increases the range of motion of the blade to such an extent that it enters the ground at the moment when it has attained its greatest velocity, and will be gradually stopped by the resistance offered by the ground before the connecting link has reached the limit of its free motion, and as the connecting link is to a certain extent flexible, any sudden jar to the apparatus will be avoided.

In the practice of my invention I provide a series of revolving cutting blades or choppers 7, which may be of any preferred form, as for instance that shown in Figures 3 and 4 of the accompanying drawings, which I have found well adapted for use in connection with my apparatus, and which consist of a body or spade portion 8, provided with an arm or handle 9 extending at an angle from the upper edge thereof and having a strengthening rib 10 centrally located upon its face; said rib extending along the handle and being continued to a point on the spade at or near where it enters the ground, and conforming approximately to the shape of the spade and handle, and at the point 8$^a$ where arm 9 and blade 8 join, the latter is thickened out in the form of a hump in order to provide additional weight at this point. A cutter constructed in accordance with the above, while fulfilling all of the requirements of a spade, is easily extricated if a heavy obstruction should be met with, as the edge of the rib will slide over such obstruction and free the spade without injury to the apparatus and by reason of the distribution of weight due to the hump 8ª, the blade will always strike the ground in an approximately vertical position; in a manner to be presently described. The construction of the blades can be varied to suit different conditions of work without in any way departing from the nature of my invention.

The revolving blades 7, are arranged in pairs as illustrated in Figures 3, 4 and 5, around a horizontal transverse driving shaft 11, and are connected to the same through the medium of two-armed carrier levers 12, and spring links 13. The links 13 are made of a single rod of spring steel, and their flexibility is increased by means of several bends in them adjacent to the ends, as illustrated in Figure 1. The carrier levers 12 are rigidly connected to the shaft 11 and are provided at or near their outer ends with bearings 14 into which are journaled one end of the links 13. The arms 12 as shown in Figure 3, may also be provided adjacent to said bearings with stops 15 against which the bends near the inner ends of the links 13 abut, thereby limiting the movement of the same. To the outer ends of the links 13 are pivotally connected the blades 7, their range of movement being controlled by the bends in the links at this point, against which the arms 9 abut.

When the shaft 11 is rotated in the direction indicated by the arrow a, in Figure 3, the blades will be thrown outward by centrifugal force, and during their travel downward will assume a substantially vertical position by reason of the weight 8ª, which will cause them to swing around their pivot points until the arm 9 abuts against the bend in the link 13 and increase in velocity until they come in contact with the ground. As the shaft 11 continues to rotate, the blades 7 will be held in an upright position until the carrier lever 12 has passed its lowest position and begins to rise. As the carrier lever 12 is comparatively short and is nearest its lowest position when the blade enters the ground, the blade and a portion of ground will be pulled slowly backward, or in a direction opposite to the travel of the machine, and as the carrier lever rises the blade will operate, first to turn the portion of ground over, and will then continue to swing and pass over the same until it is free, when centrifugal force will act to throw the links and blades out into position for another thrust, as illustrated in Figures 2 and 3.

In my improved form of apparatus I prefer to make use of a large number of blades arranged around a shaft at different angles, as illustrated in Figures 1 and 2, although any number of blades set at any desired angle may be used without departing from the nature of my invention.

In the construction illustrated in Figure 4, two links 13 and 16 are used, the link 16 serving as a guide to hold the blade 7 in the proper position for operation. Such an arrangement also avoids the necessity for the hump or weight 8ª, thus permitting of the use of special forms of blades which might be desirable for certain classes of work.

A still further form of modification in the manner of mounting the blades on the shaft, is shown in Figure 5, the carrier lever in this instance being in the form of a flat spring, and having an additional link 17 interposed between the link 13 and carrier lever 12, for the purpose of giving a greater range of movement to the blade 7. In this construction a greater number of links can be used if desired, and they may be either in the form of a spring, as before, or rigid, as the carrier lever 12 will, in this construction, afford the necessary amount of flexibility to the apparatus.

The shaft 11 may be supported and rotated from any suitable carriage, such for instance as that illustrated in Figures 1 and 2, wherein said shaft is mounted in a supporting frame 18, which in turn is journaled upon a shaft 19 mounted in bearings 20 upon the frame of a suitable carriage 21, in such a manner as to allow the frame 18 to be raised and lowered at its rear end. The shaft 19 also serves as a power shaft and is provided at its ends with sprocket wheels 22 which in turn are connected to similar wheels 23, upon the ends of the shaft 11, by means of chains 24.

A suitable motor 25, of any preferred form is mounted upon the carriage 21 and serves to rotate the shaft 19, through the medium of a clutch and gear mechanism 26, which may be of any desired construction. The motor 25 also serves to propel the apparatus and to raise and lower the frame 18 in a manner to be presently described.

The frame 18 is provided with two segmental gears 27, which intermesh with pinions 28 and 29, mounted upon a transverse shaft 30 journaled in bearings 31 secured to the shaft 30, while the other, 29, is secured to the shaft by means of a key 32 which permits it to be shifted longitudinally along the shaft as indicated in Figure 6. The pinion 29 is also provided with a ratchet 33 which engages with a corresponding ratchet attached to a worm wheel 34 loosely mounted upon the shaft 30. The two ratchets are held normally in contact with each other by a spring 35 secured around the shaft 30. The worm wheel is operated by means of a worm and shaft 36, which are rotated when desired, through the medium of a reversing gear 37 mounted on said shaft and adapted to intermesh with a gear on the shaft of the motor 25. The ratchet 33 permits the shaft 30 and pinions 28 and 29 to revolve independently of the worm wheel 34, in one direction, thus permitting the frame 18 to be lifted freely if desired.

If desired, a harrow 38 or any other implement may be attached to the rear of the frame 18, as shown in Figure 2, and when such attachment is used, the ratchet 33 is thrown out of engagement with the worm wheel 34 and the frame allowed to rest upon such attachment.

Having thus described my invention and illustrated its use, what I claim as new and desire to secure by Letters Patent, is the following:

1. A cultivator comprising a blade, a rotary actuating device and a spring link entirely supporting the blade from the actuating device.

2. A cultivator comprising a blade, a rotatable shaft, an arm on said shaft and a spring link entirely supporting the blade from the arm.

3. A cultivator comprising a blade, a rotatable shaft, an arm on said shaft and a supporting link pivoted to the blade and arm.

4. A cultivator comprising a blade, a rotatable shaft, an arm on said shaft and a spring link pivoted to the blade and arm and serving to connect and support the blade from the arm at all times.

5. A cultivator comprising a series of blades, a rotatable shaft, a series of arms on said shaft, spring links connecting the blades and arms and serving to support the blades from the arms, together with means for supporting and rotating the shaft and blades.

6. A cultivator comprising a series of blades, a rotary actuating device, flexible supporting connections between the blade and actuating device, together with means for supporting and rotating the actuating device.

7. A cultivator comprising a series of blades, a rotatable shaft, a series of arms on said shaft, spring links entirely supporting the blades from the arms, a frame in which said shaft is mounted, a carriage carrying said frame, together with means for raising and lowering the frame and rotating the shaft.

In testimony whereof I have hereunto signed my name in the presence of the two subscribed witnesses.

LORENTS AKSNES

Witnesses:
   F. E. GAITHER,
   ARCHWORTH MARTIN.